United States Patent
Maji et al.

(10) Patent No.: US 10,404,069 B2
(45) Date of Patent: Sep. 3, 2019

(54) DRIVING CIRCUIT, DRIVING ARRANGEMENT AND DRIVING METHOD, SUITABLE FOR GRID FEEDING

(71) Applicant: SIGNIFY HOLDING B.V., Eindhoven (NL)

(72) Inventors: Goutam Maji, Bangalore (IN); Venkata Sriiram Pullela, Bangalore (IN); Mahadev Cholachagudda, Bengaluru (IN); Girish Ramdas Wabale, Banglore (IN); Vasu Poojary, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 132 days.

(21) Appl. No.: 15/336,421

(22) Filed: Oct. 27, 2016

(65) Prior Publication Data

US 2017/0133850 A1    May 11, 2017

(30) Foreign Application Priority Data

Nov. 5, 2015   (EP) ..................... 15193155

(51) Int. Cl.
| | |
|---|---|
| *H02J 7/00* | (2006.01) |
| *H02J 9/00* | (2006.01) |
| *H02J 3/32* | (2006.01) |
| *H02M 7/44* | (2006.01) |
| *H02J 3/28* | (2006.01) |
| *H05B 33/08* | (2006.01) |
| *H02J 7/34* | (2006.01) |

(52) U.S. Cl.
CPC ................. *H02J 3/32* (2013.01); *H02J 3/28* (2013.01); *H02J 7/007* (2013.01); *H02M 7/44* (2013.01); *H05B 33/0809* (2013.01); *H02J 7/0024* (2013.01); *H02J 7/34* (2013.01)

(58) Field of Classification Search
CPC ...... H02J 3/32; H02J 7/007; H02J 3/28; H02J 7/34; H02J 7/0024; H05B 33/08; H05B 33/0809; H02M 7/44
USPC ........................................................ 307/66
See application file for complete search history.

(56) References Cited

U.S. PATENT DOCUMENTS

| | | | | |
|---|---|---|---|---|
| 8,400,014 | B2 * | 3/2013 | Li ................ | H02J 7/0068 307/48 |
| 2004/0263116 | A1 | 12/2004 | Doruk et al. | |
| 2007/0114969 | A1 | 5/2007 | Mamaropoulos | |
| 2011/0133558 | A1 | 6/2011 | Park | |
| 2011/0140667 | A1 | 6/2011 | Moon | |
| 2012/0256568 | A1 * | 10/2012 | Lee ................ | H02J 7/0024 318/139 |

(Continued)

*Primary Examiner* — Richard Tan (57) ABSTRACT

A driving circuit for driving an appliance has a two-line power input, a first output for connection to the appliance, a second, two-line, output, an internal energy source and a switching arrangement. The switching arrangement is configurable into at least a first mode, in which the two-line power input is connected to the second, two-line, output, and the internal energy source is isolated from direct connection to the two-line power input, and a second mode in which the internal energy source is in series between a first line of the two-line power input and a corresponding first line of the second, two-line, output. The first mode is used for normal operation of an appliance and the second mode is used for grid feeding.

14 Claims, 6 Drawing Sheets

(56) References Cited

U.S. PATENT DOCUMENTS

| | | |
|---|---|---|
| 2015/0028817 A1 | 1/2015 | Brockerhoff |
| 2015/0066231 A1 | 3/2015 | Clifton |
| 2015/0130282 A1 | 5/2015 | Kpnv |
| 2015/0295442 A1 | 10/2015 | Seymour et al. |

* cited by examiner

DRIVING CIRCUIT, DRIVING ARRANGEMENT AND DRIVING METHOD, SUITABLE FOR GRID FEEDING

FIELD OF THE INVENTION

This invention relates generally to the field of grid feeding from distributed energy sources, and more specifically to a driving circuit and method able to implement grid feeding.

BACKGROUND OF THE INVENTION

Electrical energy is often generated by power stations that are located several miles away from where the electrical energy is consumed. This locational mismatch between electrical energy generation and electrical energy consumption can lead to some logistical challenges arising when it comes to distributing the generated electrical energy. To further complicate the problem, more electrical energy is typically consumed at specific hours during the day, which are referred to as peak hours. Peak hours are, for example, when high energy appliances such as heaters or air conditioning units are required by multiple consumers at the same time.

The energy demand at peak times leads to a strain on both the power stations attempting to generate the necessary quantity of electrical energy and the distribution networks attempting to deliver the generated energy to the consumers from the power stations. The cost of generating electrical energy at peak times increases due to operating power stations in a less efficient regime in order to generate more power.

Using the current power generation and distribution network topologies, significant investments must be made in both electrical energy generation and distribution capabilities, in order to keep pace with the ever increasing energy demand. However, despite the strenuous demands placed on power stations and distribution networks at peak times, the same power stations are underutilised during periods of low demand. This fluctuation in demand can be especially problematic for fuel-based power plants, which are more easily and efficiently operated at a constant electrical energy production level. It is therefore not economical to build more power stations to cope with the peak demand, when the power stations are only fully utilized for a small number of hours per day. It is rational however, to suggest that energy could be produced and stored during the time periods in which the existing power stations are underutilized. Localising this stored energy to a power station or purpose built commercial power bank does not alleviate the strain placed upon the power distribution network during peak times. Hence, the pragmatic approach to alleviating the peak demand placed upon power stations is to both generate and distribute energy during off-peak hours and then use the pre-distributed stored energy during peak periods to alleviate the strain placed upon power stations and the distribution network during peak periods. This method would however rely on end users installing relatively expensive energy storage, which may not be desirable.

Energy storage has the potential to dramatically change the challenges associated with peak time energy generations and delivery. Utilising energy sources integrated with other hardware enables distributed energy sources to be introduced to the end users whilst minimising impact on expenditure. Distributed energy sources are gaining momentum and playing an essential role in the process of improving the reliability of electrical systems and reducing the peak load placed on power generation and distribution systems through the use of smart load management.

Although stored electrical energy is recovered in a direct current format, mains electricity is distributed and consumed in an alternating current format. The alternating current format is utilised for mains electricity because it is more convenient to transport and it is the format in which electrical energy is inherently recovered from a generator. The issue of power conversion is relatively trivial. The implementation of a mains inverter allows the stored DC electrical energy to be converted into an AC format suitable for mains powered devices.

Electrical energy providers have a vested interest in reducing the peak load placed upon power generation and distribution systems. They have attempted to mitigate the problem through the use of demand side management incentives, for example, by offering lower cost energy during off peak periods or by offering to pay a feed in tariff for supplemental electrical energy provided to the supplier during peak periods; these schemes envisage successful power management being obtained through altering consumer behaviour. One of the main goals of demand side management is to enable the price of electricity to be set dynamically based on the cost of electricity generation at a given time. Dynamic pricing would theoretically give rise to a supply and demand scenario and hence lead to a reduction in peak energy consumption, although it is unlikely to be a scheme readily adopted by end users.

The implementation of smart load management is the critical next step in helping consumers to take advantage of the favourable off-peak energy rates, without incurring the increased cost of electricity at peak times or sacrificing the use of utilities. Driving circuits capable of utilising distributed energy storage for demand side management facilitate the consumer in reducing their real time energy demand and energy cost as well as concurrently providing an emergency backup system for providing energy to critical facilities, such as lighting, in the event of a power cut.

Driving circuits controlling current distributed energy storage systems are able to provide peak load management by ending the charge cycle during peak periods and using the energy stored to power an attached appliance. This system works sufficiently to power the attached appliance, but it does not fully utilise the stored power in all circumstances. For example, if there is more stored energy than is required by the attached appliance then the stored energy will not be used in the most effective manner to reduce the peak load placed upon power stations and the energy distribution network.

SUMMARY OF THE INVENTION

It would be desirable to connect underutilised stored energy in distributed energy sources to appliances not directly attached to the distributed energy sources, or more preferably deliver the stored energy back to the mains supply in order to take advantage of demand side management incentives, such as feed in tariffs. Furthermore, it would be advantageous if the distributed energy storage network could be interfaced with a mains inverter at a voltage greater than that of a typical energy storage unit. This would enable the increased efficiency associated with a smaller voltage mismatch to be realised. Even more, it would be advantageous if the distributed energy storage can be series connected and provide a high voltage for grid feeding, thereby improving the grid feeding efficiency.

A basic idea is designing a switch arrangement between the existing line and the energy source, wherein said switch arrangement is configurable with different modes respectively for isolating from other energy sources for normal operation and for series connecting with other energy sources for grid feeding.

The invention is defined by the claims.

According to examples in accordance with an aspect of the invention, there is provided a driving circuit for driving an appliance, comprising:
  a two-line power input;
  a first output for connection to the appliance;
  a second, two-line, output;
  an internal energy source; and
  a switching arrangement, wherein the second two-line output is coupled to the two-line power input via the switching arrangement and the switching arrangement is configurable into:
    a first mode, in which the two-line power input is connected to the second, two-line, output, and the internal energy source is isolated from direct connection to the two-line power input; and
    a second mode in which the internal energy source is in series between a first line of the two-line power input and a corresponding first line of the second, two-line, output.

The two-line power input may for example function as a mains input and then provides the power source to the appliance when the switching arrangement is in the first mode. In this case, multiple driving circuits can be connected in a daisy chain, with the power supply connected to each one of the driving circuits.

In the first mode, the internal energy source is isolated from the two-line power input and is isolated from other energy sources. This means it may be used by the driving circuit for providing power to the appliance (for example when two-line power input has an interruption) thus it is at the output side of the driving circuit; or it may be charged using power provided to the two-line power input and it is again at the output side of the driving circuit.

In the second mode, the internal energy source is in series between the input and second, two-line, output. Thus, it is connected to the input and output and this connection enables a certain connection between the distributed energy storage and the input line. More specifically, this means that when multiple driving circuits are coupled together, a series connection of the internal energy sources may be presented across the two-line power input. This may be used for example for grid feeding. This presents a larger voltage to the power input for grid feeding so as to provide a high efficiency.

The driving circuit provides power management of an attached appliance for example to allow a consumer to make the best use of low cost off peak energy to run the appliance and charge the internal energy source. The consumer may then benefit from feed in tariffs offered by an electricity supplier during peak periods.

The switching arrangement may be configurable into a third mode, which is a series termination mode, in which the internal energy source is in series between a first line of the two-line power input and a second line of the second, two-line, output.

In the third mode, the last driving circuit in a chain may be connected back to the grid. This means that when multiple driving circuits are coupled together in a series configuration, using the second mode of operation, a series connection can be completed across the two-line power input by implementing a last driving circuit operating in this third mode. This completes the series connection back to the power input.

The switching arrangement may further comprise:
  a first switch in series between the first line of the two-line power input and the corresponding first line of the second, two-line, output; and
  a second switch for connecting the internal energy store in parallel with the first switch.

The first switch thus implements the first mode by which all of the two-line power inputs are connected together, and the second switch implements the second mode by which the internal energy source is in series between one line (e.g. live) of the two-line power input and the corresponding line of the second, two-line, output.

The switching arrangement preferably comprises:
  a third switch in series between one terminal of the internal energy source and a second line of the second, two-line, output; and
  a direct connection between the second line of the two-line power input and the corresponding second line of the second, two-line, output.

This third switch enables one terminal of the internal energy source of the driving circuit at the end of a daisy chain to be connected to the second line of the two-line power input, for example to neutral. This completes the series connection of the internal energy sources.

The first line of the two-line power input may comprise a mains live line and the second line of the two-line power input comprises a mains neutral line.

Direct connection to the mains live line and the mains neutral line allow for the driving circuit to be interfaced directly with the mains wiring to facilitate grid feeding.

The driving circuit may comprise a driver unit coupled to the two-line power input wherein the driver unit is adapted to:
  control the supply of power to the appliance from the two-line power input or from the internal energy source; and
  control charging of the internal energy source.

The internal energy source for example comprises a rechargeable battery. The driver unit controls charging of the battery and also the use of the stored battery energy to supply the load. This may for example give a backup supply or it may enable time shifting, by which the internal energy source is charged during times of low tariff and discharged during times of high tariff. If the energy stored is not needed, it may be fed back to the grid. If a daisy chain is formed by units in the first mode, all driver units are connected with the input line in a parallel manner.

The switching arrangement may be configurable into a fourth mode, which is a parallel feeding mode, in which the internal energy source is presented across the first and second line of the first two-line power input and the first line of the two-line power input is not connected to the first line of the second, two-line, output. Thus, the internal energy source is in parallel with the first two-line power input.

Note that the switch configuration of the third mode and the fourth mode may be the same. The fourth mode may be used in combination with other driving circuits in the first mode (which is the normal operation mode). In this way, the fourth mode enables a single internal energy source to be presented across the two-line power input, this may be used for example, for grid feeding from a single internal energy source in parallel.

Examples in accordance with another aspect of the invention further provide an appliance unit, comprising:
an appliance, such as a lighting unit; and
a driving circuit.

This provides an appliance together with its associated driving circuit.

Examples in accordance with another aspect of the invention provide a driving arrangement, comprising:
a set of driving circuits, each as defined above connected together in a chain, with the second two-line output of one driving circuit connected to the two-line power input of the next driving circuit in the chain, wherein each driving circuit is for driving a respective appliance.

This provides a driving arrangement comprising a series connection of driver units, each driving a respective appliance. They may all be identical.

Examples in accordance with another aspect of the invention provide a driving arrangement or an energy storage system, comprising:
a plurality of driving circuits each with the three modes as defined above, connected together in a series chain, with the second two-line output of one driving circuit connected to the two-line power input of the next driving circuit in the chain, wherein the switching arrangements are configurable into:
a normal mode wherein the switching arrangement of all driving circuits are configured to the first mode; and
a grid feeding mode wherein the switching arrangement of all driving circuits except for the driving circuit at the end of the chain are configured to the second mode and the driving circuit at the end of the chain is configured to the third mode.

This provides a driving arrangement or an energy storage system comprising a plurality of driving circuits each with the internal energy sources provided in series across the first two-line power input offering the capability of grid feeding from multiple internal energy sources in series simultaneously.

The switching arrangements may be configurable into a parallel feeding mode, in which a single driving circuit is adapted to operate in a fourth mode in which the internal energy source is in parallel with the two-line power input and the first line of the two-line power input is not connected to the first line of the second, two-line, output, while other driving circuits in the chain are adapted to operate in the first mode.

This arrangement allows the internal power source from a single driving circuit to be applied in parallel across the two-line power input. This may be used for example, for grid feeding of a single internal energy source. This may be advantageous in a situation wherein the internal power sources of a plurality of driver units do not have the same level of remaining supply capacity for example, if some units have been depleted at higher rate than others.

Furthermore, the driving arrangement or energy storage system may have the two-line power input of one driving circuit connected to a mains live and neutral, with the second, two-line, output of one driving circuit connected to the two-line power input of the next driving circuit in the chain for transmitting power through the chain. This provides a continuous power source through the driving arrangement, without the need to run the mains power supply to each driving circuit individually.

The driving circuits may each comprise a wireless transceiver to enable communication between each other or other user input devices. Inter-driving circuit communications can help each appliance to determine the correct operational mode. The use of wireless transceivers removes the need to install any additional cables and allows operators to interface with the driver units.

Examples in accordance with another aspect of the invention provide a method of driving an appliance using a driving circuit having a two-line power input, a first output for connection to the appliance, a second, two-line, output for connection to another driving circuit, and an internal energy source, wherein the method comprises, at different times, configuring a switching arrangement into:
a first mode, in which the two-line power input is coupled to the second, two-line, output, and the internal energy source is isolated from direct connection to the two-line power input; and
a second mode in which the internal energy source is in series between a first line of the two-line power input and a corresponding first line of the second, two-line, output.

The method may comprise configuring a switching arrangement into:
a third mode, which is a series termination mode, in which the internal energy source is in series between a first line of the two-line power input and a second line of the second, two-line, output; or
a fourth mode, which is a parallel feeding mode, in which the internal energy source is in parallel with the two-line power input and the first line of the two-line power input is not connected to the first line of the second, two-line, output.

The modes are used at different times depending on the needs of the appliance.

This method involves using a driving circuit to configure a switching arrangement for managing an internal energy source effectively for supplying energy to an appliance or for grid feeding.

The method may further comprise controlling the supply of power to an appliance from the two-line mains input or from the internal energy source, and controlling charging of the internal energy source.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a driving circuit for driving an appliance, the driving circuit having a two-line power input, a first output for connection to the appliance, a second, two-line, output, an internal energy source and a switching arrangement. The switching arrangement is configurable into at least a first mode, in which the two-line power input is connected to the second, two-line, output, and the internal energy source is isolated from direct connection to the two-line power input, and a second mode in which the internal energy source is in series between a first line of the two-line power input and a corresponding first line of the second, two-line, output. The first mode is used for normal operation of an appliance and the second mode is used for grid feeding.

The driving circuit is a modular unit, and multiple units may be connected together to form a driving arrangement. The switching arrangement of each unit may then be configured accordingly to define the overall mode of operation of the complete driving arrangement. The driving arrangement may be formed of identical modular units, but this is not essential.

The overall modes of operation include a normal operation mode, in which each driving circuit drives its connected appliance from the mains, with the internal energy source for example providing a backup power supply. A grid feeding mode is also enabled in which the internal energy sources are connected in series for feeding energy back to the mains grid.

One of the modular units will first be described as well as its different configurations of the switching arrangement, before the different possible modes of a combined driving arrangement will be described.

Figure 1:
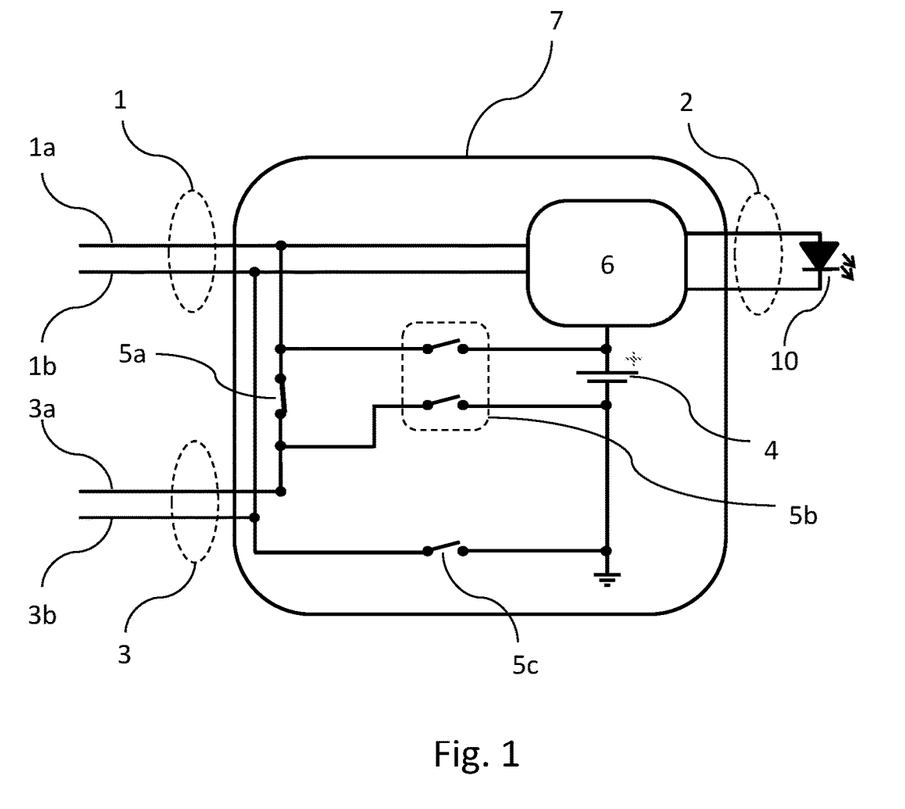
FIG. 1 shows a driving circuit operating in a first mode of operation.

FIG. 1 shows a driving circuit 7 (i.e. one modular unit) in a first of four operational modes. As will be described below, the third and fourth modes described are the same at the level of the individual driving circuit, but they are used in different combinations so that there are four overall modes for the driving arrangement.

The driving circuit 7 comprises a two-line power input 1 having live and neutral lines 1a, 1b and a first two-line output 2 for connection to an appliance 10, which in this example is shown as an LED arrangement.

There is a second, two-line, output 3 having first and second lines 3a, 3b.

An internal energy source 4 functions as a backup energy supply, but it also used as an energy storage system for charging from the grid at off-peak times and feeding back to the grid at peak times.

A switching arrangement comprises three switches 5a, 5b, 5c (one of which is a double pole switch). In order to realise the modes of operation described below, the switching arrangement requires a minimum of three switches, although it may comprise four or more switches in a different implementation.

The switches of the switching arrangement are electronically controlled, and they may comprise relays or transistors.

The first line 1a of the two-line power input 1 is electrically connected to the first line 3a of the second, two-line, output 3 via the first switch 5a. The first line 1a of the two-line power input is for example for connection to a mains live wire. The second line 1b of the two-line power input 1 is permanently electrically connected to the second line 3b of the second, two-line, output 3. The second line 1b of the two-line power input is for example for connection to the mains neutral wire.

As will be shown below, the driving circuits are for connection in series in a chain, with the second, two-line, output 3 of one connected to the first input 1 of the next.

Thus, it can be seen that the switch 5a enables the mains live input 1a of each driving circuit in the chain to be connected together.

The positive terminal of the internal energy source 4 is connected to the first line 1a of the two-line power input 1 via one switching element of the second switch 5b. The negative terminal of the internal energy source 4 is connected to the first line 3a of the second, two-line, output. Thus, the internal energy source is connected in parallel with the first switch 5a. This means that the first line 1a of the first input 1 can either be connected to the first line 3a of the second, two-line, output, or else the internal energy source 4 may be in series between the first line 1a of the two-line power input 1 and the first line 3a of the second, two-line, output.

The negative terminal of the internal energy source 4 is also connected to the second line 3b of the second, two-line, output via the third switch 5c.

The switching arrangement 5a,b,c in this example comprises a first switch 5a which is a single pole, single throw switch, a second switch 5b which is a double pole, single throw switch and a third switch 5, which is a single pole, single throw switch.

The internal energy source 4 may, for example, comprise a rechargeable battery or a type of capacitor such as a super capacitor. This may for example give a backup supply or it may enable time shifting, by which the internal energy source is charged during times of low tariff and discharged during times of high tariff. If the energy stored is not needed, it may be fed back to the grid.

The driver unit 6 is used to control parts of the circuit or the entire circuit including the switches, charging and discharging of the internal energy source and the electrical output to the appliance, for example, to provide management of supply of energy to the appliance 10 and to the internal energy source 4. The driver unit 6 is electrically connected to the positive terminal of the internal energy source 4, to the first and second lines 1a, 1b of the two-line power input, and to the first output 2 for connection to the appliance 10.

For the example of an LED driving circuit, the driver unit 6 is a known LED driver, such as a switch mode power supply, and also control circuitry for controlling the charging and discharging of the internal energy supply 4. The driver unit 6 is for example a hardware device including a processor for executing software that can be stored in an internal memory. The driver unit 6 can include virtually any custom made or commercially available processor, a central processing unit (CPU), a digital signal processor (DSP), an auxiliary processor, or semiconductor based microprocessor in the form of a microchip.

FIG. 1 shows the driving circuit in a first mode of operation. In the first mode, the switching arrangement 5a,b,c is configured such that the first switch 5a is a short circuit, to provide power from the two-line power input 1 through to the second, two-line, output 3. The second switch 5b is open circuit, to isolate the internal power source 4 from the two-line power input 1 of the driving circuit 7. The third switch 5c is open circuit, also to isolate the internal power source 4 from the input side of the driving circuit. This mode provides coupling of the input power between driving circuits, but the internal energy source 4 is controlled by the driver unit 6 and is isolated from the input side of the circuit by the driver unit 6.

Figure 2:
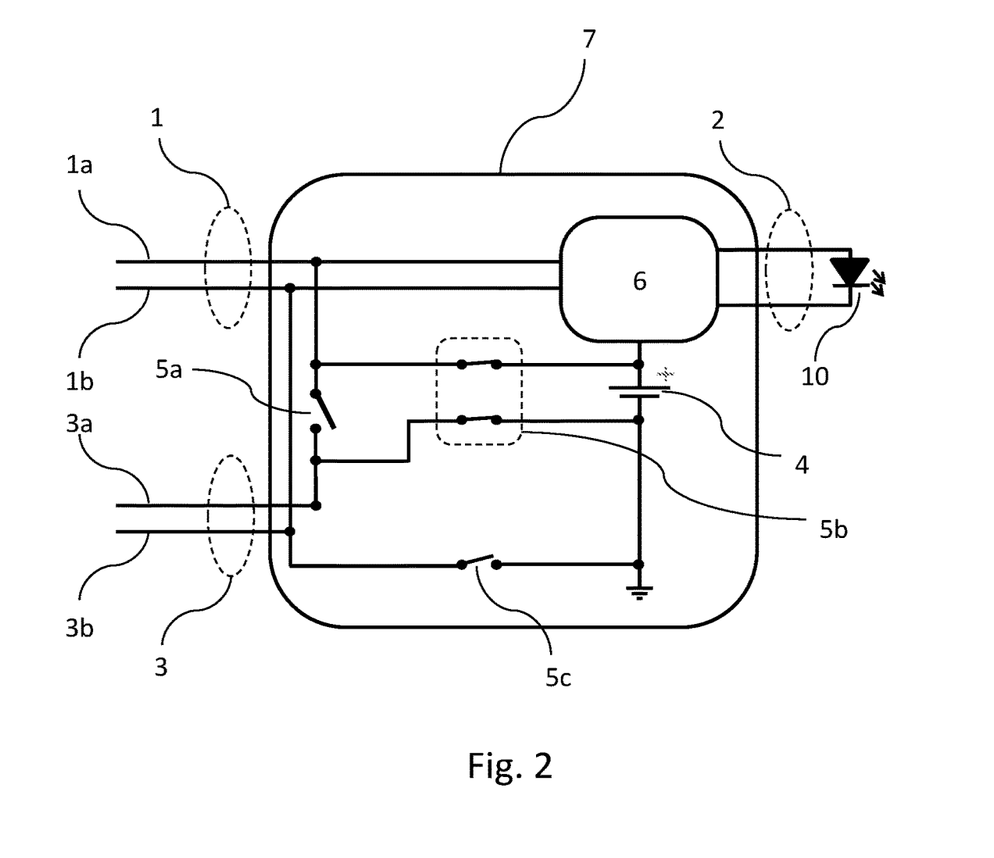
FIG. 2 shows a driving circuit operating in a second mode of operation.

FIG. 2 shows the driving circuit 7 in the second mode of operation.

The switching arrangement 5a,b,c is configured such that the first switch 5a is open circuit, in order to break the direct connection between the two-line power input 1 and the second, two-line, output 3, ready for the internal energy source 4 to be introduced in place of the first switch. Switch 5b is short circuit, to introduce the internal power source in series between the first line 1a of the two-line power input 1 and the first line 3a of the second, two-line, output. The internal energy source is thus coupled to the input and output, ready for connecting in series with other energy sources and for grid feeding. The third switch 5c is open circuit, to prevent a grounding of the second line 3b of the second, two-line, output 3. In this mode of operation, the internal energy source is in series between the first line of the two-line power input 1 and a corresponding first line of the second, two-line, output 3.

This means that when multiple driving circuits are coupled together, a series connection of the internal energy sources 4 may be presented across the two-line power input 1. This may be used for example for grid feeding. This presents a larger voltage to the power input for grid feeding. However, multiple driving circuits coupled together in this second mode of operation would result in an incomplete circuit, hence a third mode is necessary.

Figure 3:
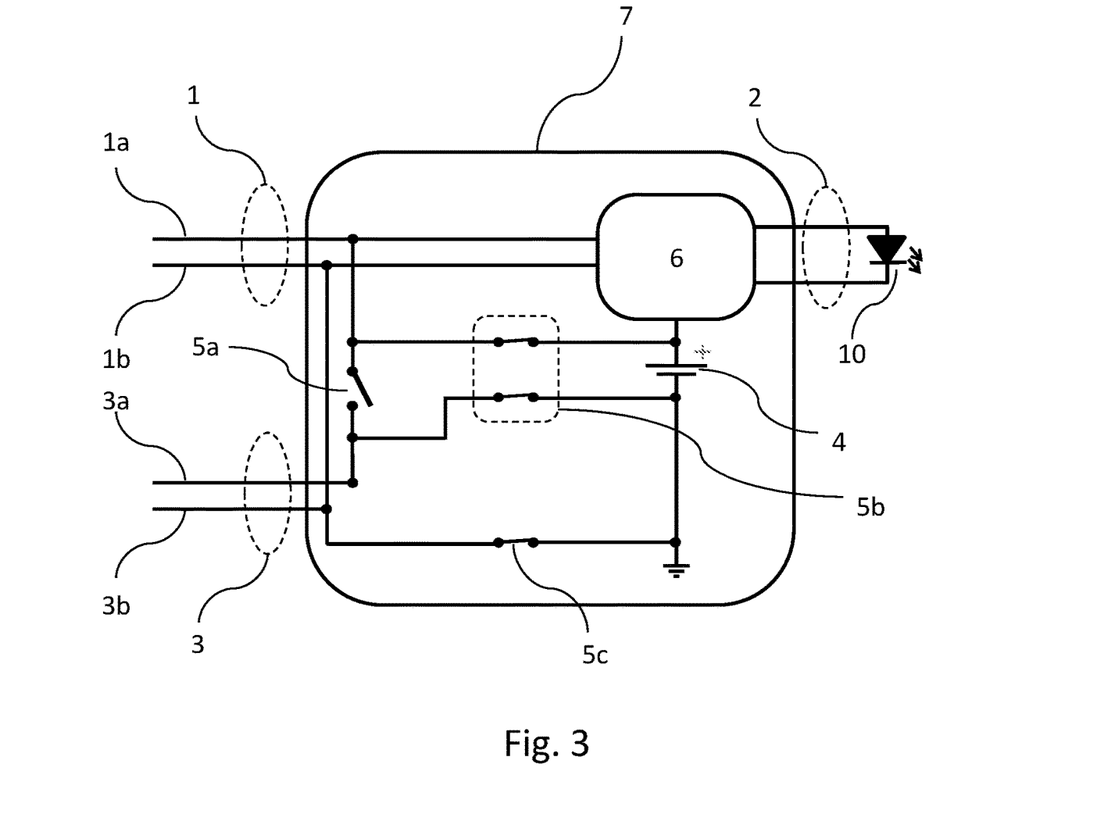
FIG. 3 shows a driving circuit operating in a third mode of operation.

FIG. 3 shows the driving circuit 7 in the third mode of operation. This may be considered to be a series termination mode.

In the third mode of operation the switching arrangement is configured such that the first switch 5a is open circuit, in order to break the direct connection from the two-line power input 1 through to the second, two-line, output 3 and switch 5b is short circuit, to couple the internal power source 4 between the first line 1a of the two-line power input 1 and the first line 3a of the second, two-line, output 3, ready for grid feeding The internal energy source 4 is thus presented across the first 1a and second 1b line of the first two-line power input 1.

Unlike the second mode of operation, the third switch 5c is switched to a short circuit. The third switch 5c is only required to be closed in the last driving circuit in a chain, hence the third switch 5c could be absent in all but the last driving circuit in a sequence of driving circuits to reduce production costs. Alternatively, all driving circuits could be identical, and an external switch could be coupled to the last one in the series.

This third mode has two functions, which will be explained below. The first is the termination mode described above. When multiple driving circuits are coupled together in a series configuration, such as in the second mode of operation, the last driving circuit in the series chain additionally provides a connection of the negative terminal of the last internal energy source 4 to the neutral line (i.e. to ground).

The second function is a parallel feeding mode, in which a selected internal energy source is connected in parallel with the first two-line power input 1. This may be considered to be a fourth mode of operation, even though the switch configuration is the same as the third mode of operation.

The resulting series configuration of the internal energy sources when using driving circuits in the second and third modes of operation is advantageous for grid feeding as the increased voltage offers efficiency benefits when converting between DC and AC.

The driving circuit may for example be part of an LED lighting fixture or luminaire and the internal energy source in each driving circuit is a 16.4 Volts DC, 60 Watt hour Lithium ion battery. The stored voltage is significantly lower than the mains voltage, which may be in the range of 110 to 230 Volts AC. Combining the distributed battery sources in series from the individual luminaires using the existing two wire utility supply line allows a substantial voltage increase in the stored energy to support other loads or grid feeding. For example, four 16.4 Volts DC, 60 Watt hour Lithium ion batteries may be connected in series to reach 65.6 Volts DC and 240 Wh. The 240 Wh energy can support to other internal loads or feed to the grid for one hour with 240 W of power during the peak period.

Using a series configuration avoids the issues associated with joining multiple DC sources in parallel, such as circulating currents which may result in battery damage. Distributing power between the sources using an existing power supply wire such as a two wire mains utility wiring removes some of the cost associated with installing such a system.

Figure 4:
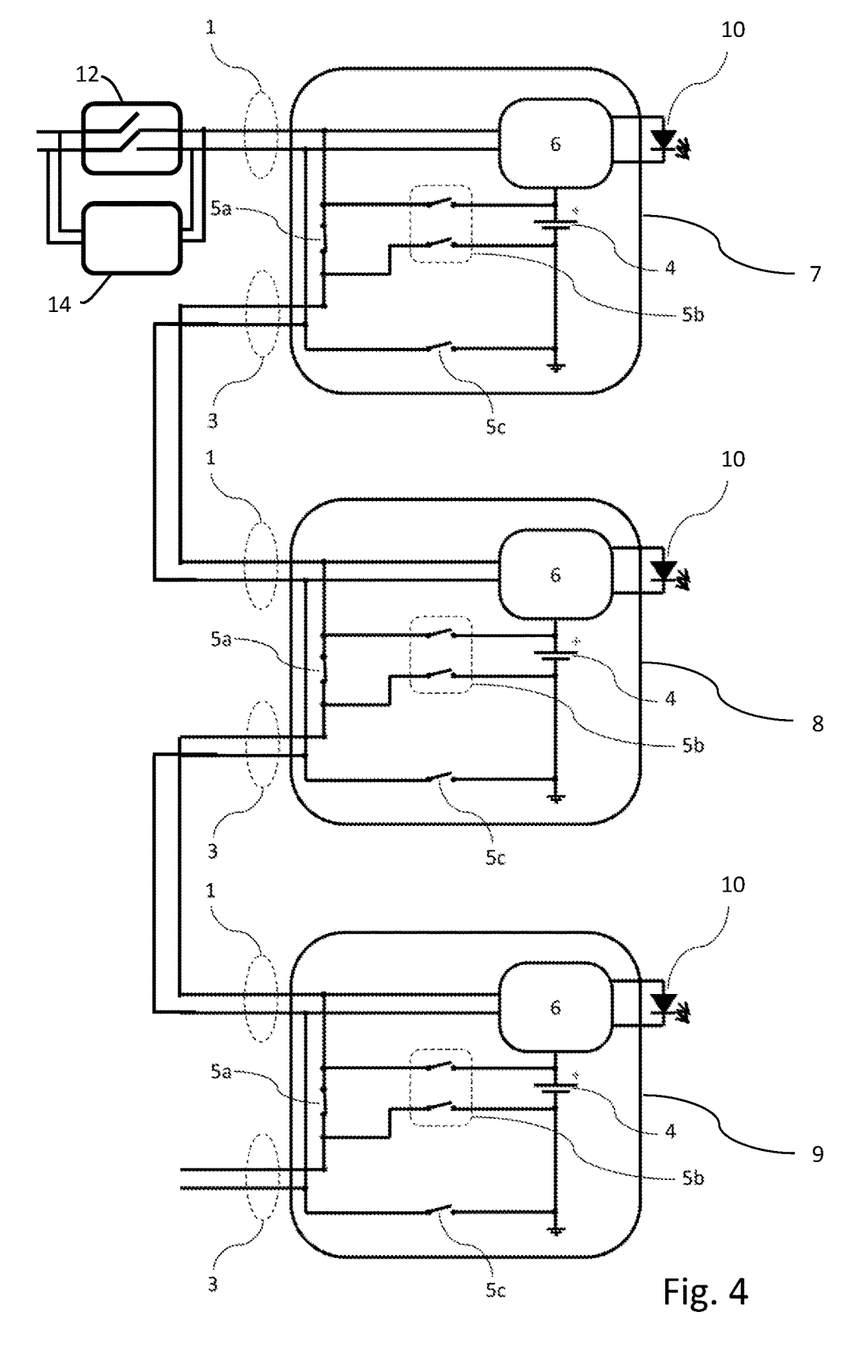
FIG. 4 shows a driving arrangement containing three driving circuits all in the first mode of operation.

FIG. 4 shows a driving arrangement comprising a plurality of driving circuits 7,8,9 as described above. It additionally shows a main switch 12 at the input and a grid feed inverter 14. In this instance, the driving arrangement contains three driving circuits 7,8,9 all in the first mode of operation. The first mode of operation is used for charging the internal energy source 4 using the drive unit 6 and powering the appliance 10. In the first mode of operation the internal energy source 4 is isolated from the two-line power input 1. This means it may be used by the driving circuit 7 as an input for providing power to the appliance 10 or it may be charged as an output using power provided to the two-line power input 1. Each driving circuit functions essentially independently.

Figure 5:
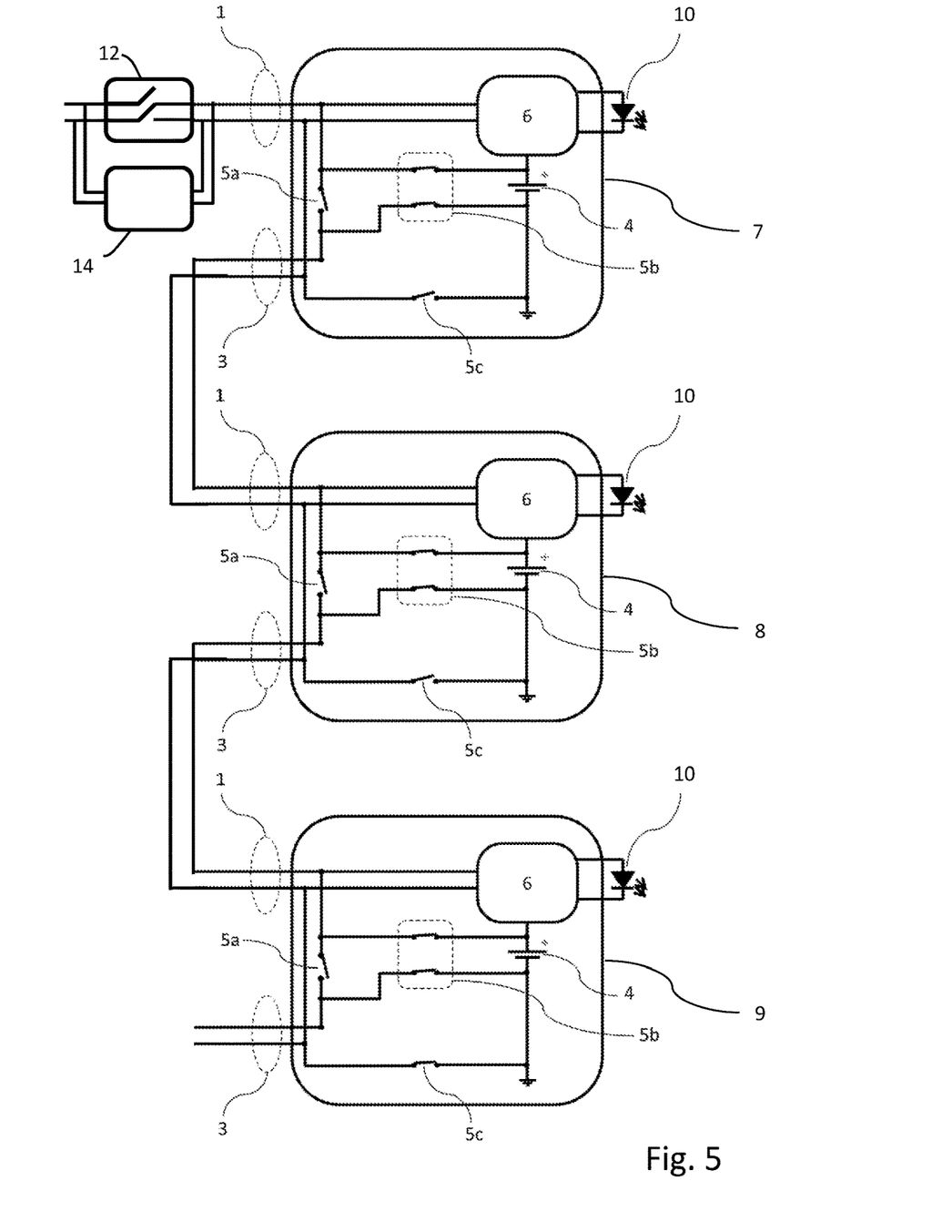
FIG. 5 shows a driving arrangement containing three driving circuits, the first two are in the second mode of operation and the final driving circuit is in the third mode of operation.

FIG. 5 shows a driving arrangement containing three driving circuits 7,8,9 in which the first two driving circuits 7,8 are configured in the second mode of operation and the final driving circuit 9 is configured in the third mode of operation. This provides a series connection of driver units 7. The alternative mode of operation used in the last driving circuit of the chain is necessary in order to complete the circuit.

The driving circuits 7 in the chain may all be identical units albeit with different configurations of the switching arrangement. If, for example, the internal energy source 4 comprises a DC storage element, an intermediary converter, such as a grid tie inverter may be used to convert between the stored energy and the alternating current used by the mains supply for grid feeding.

Figure 6:
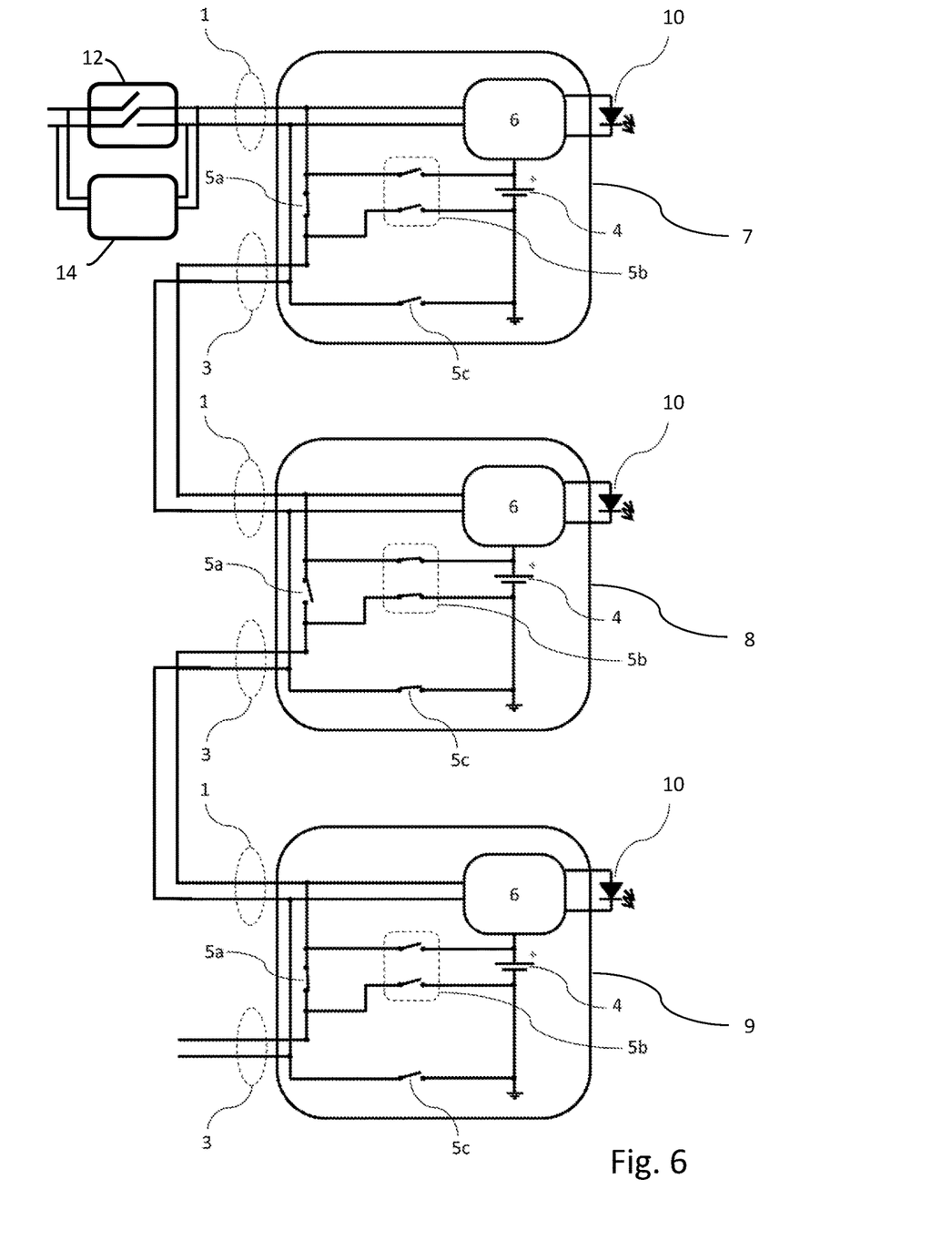
FIG. 6 shows a driving arrangement containing three driving circuits, the first and the last driving circuits are in the first mode of operation while the second driving circuit is in the fourth mode of operation.

FIG. 6 shows a driving arrangement containing three driving circuits 7 in which the first and the last driving circuits are configured in the first mode of operation, while the second driving circuit 8 is in the fourth mode of operation. This configuration enables an individual internal energy source 4 (of the driving circuit 8 in this example) to be applied in parallel across the two-wire power input 1. Providing a single internal power source 4 in parallel with the two-wire power input 1 allows the driving arrangement to provide load balancing. In the event that the internal power source 4 of one or more driving circuits 7 has been utilised for less time, or with a reduced energy demand compared with the internal power source 4 of other driving circuits 7, the internal power source 4 of a single driving circuit 7 can offer grid feeding, even if other units have insufficient resources available. The application of a single internal energy source 4 configured in parallel for grid feeding also negates the potential issues of circulating currents between a plurality of parallel cells.

The driving circuits may communicate with each other, or other devices, using high frequency data transmission over the existing wires or alternatively using wireless technologies. For example, wireless technologies including Zigbee, Bluetooth, Wifi, WiMax, IrDa, NFC or Z-Wave could be used.

An example has been given above of a lighting appliance, e.g. a luminaire. However, the invention may be applied to any appliances with an energy storage element. Various devices have a backup energy supply such as alarm systems and air treatment systems.

The switching arrangement shown is only one way to implement the required flexibility to connect the internal energy sources in series or to isolate them from each other.

The driving circuits do not need to be connected to an appliance. The driving circuits and their local energy storage elements may together comprise a distributed energy storage system only for time shifting or grid feeding.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A driving arrangement for driving a set of appliances, comprising:
    a set of driving circuits, wherein each driving circuit include,
        a two-line power input;
        a first output for connection to one of the set of appliances;
        a second, two-line, output;
        an internal energy source; and
        a switching arrangement, wherein the second, two-line, output is coupled to the two-line power input via the switching arrangement and the switching arrangement is configurable into,
            a first mode, in which the two-line power input is connected to the second, two-line, output, and the internal energy source is isolated from direct connection to the two-line power input; and
            a second mode in which the internal energy source is in series between a first line of the two-line power input and a corresponding first line of the second, two-line, output;
    wherein the set of driving circuits are connected together in a chain, with the second, two-line, output of one of the set driving circuits connected to the two-line power input of next one of the set of driving circuits in the chain, wherein each driving circuit is for driving a respective appliance.

2. The driving arrangement as claimed in claim 1, wherein the switching arrangement is configurable into the third mode which is a series termination mode, in which the internal energy source is in series between the first line of the two-line power input and a second line of the second, two-line, output.

3. The driving arrangement as claimed in claim 1, wherein the switching arrangement comprises:
    a first switch in series between the first line of the two-line power input and the corresponding first line of the second, two-line, output; and
    a second switch for connecting the internal energy store in parallel with the first switch.

4. The driving arrangement as claimed in claim 3, wherein the switching arrangement comprises:
    a third switch in series between one terminal of the internal energy source and a second line of the second, two-line, output; and
    a direct connection between the second line of the two-line power input and a corresponding second line of the second, two-line, output.

5. The driving arrangement as claimed in claim 1, wherein the first line of the two-line power input comprises a mains live line and a second line of the two-line power input comprises a mains neutral line.

6. The driving arrangement as claimed in claim 1, comprising a driver unit coupled to the two-line power input wherein the driver unit is adapted to:
    control a supply of power to the appliance from the two-line power input or from the internal energy source; and
    control charging of the internal energy source.

7. The driving arrangement as claimed in claim 1, wherein the switching arrangement is configurable into a fourth mode, which is a parallel feeding mode, in which the internal energy source is in parallel with the two-line power input and the first line of the two-line power input is not connected to the first line of the second, two-line, output.

8. An appliance unit comprising:
    the appliance, such as a lighting unit; and
    the driving arrangement as claimed in claim 1 for providing power to the corresponding one of the set of appliances.

9. The driving arrangement as claimed in claim 1, wherein the two-line power input of one driving circuit is connected to a mains live and neutral, with the second, two-line, output of one driving circuit connected to the two-line power input of the next one of the set of driving circuits in the chain for transmitting power through the chain.

10. A driving arrangement or an energy storage system for driving a set of appliances, comprising:
    a plurality of driving circuits, wherein each of the plurality of driving circuit includes,
        a two-line power input;
        a first output for connection to one of the set of appliances;
        a second, two-line, output;
        an internal energy source; and
        a switching arrangement, wherein the second, two-line, output is coupled to the two-line power input via the switching arrangement and the switching arrangement is configurable into,
            a first mode, in which the two-line power input is connected to the second, two-line, output, and the internal energy source is isolated from direct connection to the two-line power input; and
            a second mode in which the internal energy source is in series between a first line of the two-line power input and a corresponding first line of the second, two-line, output;
    wherein the switching arrangement is configurable into a third mode which is a series termination mode, in which the internal energy source is in series between the first line of the two-line power input and a second line of the second, two-line, output;
    wherein the plurality of driving circuits are connected together in a series chain, with the second-two-line output of one driving circuit connected to the two-line power input of the next driving circuit in the chain, wherein the switching arrangements are configurable into:
- a normal mode wherein the switching arrangement of all driving circuits are configured to the first mode; and
- a grid feeding mode wherein the switching arrangement of all driving circuits except for the driving circuit at an end of the chain are configured to the second mode and the driving circuit at the end of the chain is configured to the third mode.

11. The driving arrangement or the energy storage system as claimed in claim 10, wherein the switching arrangements are configurable into a parallel feeding mode, in which a single driving circuit is adapted to operate in a fourth mode in which the internal energy source is in parallel with the two-line power input and the first line of the two-line power input is not connected to the first line of the second, two-line, output, while other driving circuits in the chain are adapted to operate in the first mode.

12. A method of driving a set of appliances using a plurality of driving circuits, wherein each of the plurality of driving circuits includes a two-line power input, a first output for connection to a corresponding one of the set of the appliances, a second, two-line, output for connection to another driving circuit, and an internal energy source, wherein the method comprises, at different times, configuring a switching arrangement into:
- a first mode, in which the two-line power input is coupled to the second, two-line, output, and the internal energy source is isolated from direct connection to the two-line power input; and
- a second mode in which the internal energy source is in series between a first line of the two-line power input and a corresponding first line of the second, two-line, output;
- a third mode which is a series termination mode;

wherein the plurality of driving circuits are connected together in a series chain, with the second, two-line, output of one driving circuit connected to the two-line power input of the next driving circuit in the chain, wherein the switching arrangements are configurable into:
- a normal mode wherein the switching arrangement of all driving circuits are configured to the first mode; and
- a grid feeding mode wherein the switching arrangement of all driving circuits except for the driving circuit at an end of the chain are configured to the second mode and the driving circuit at the end of the chain is configured to the third mode.

13. The method as claimed in claim 12, comprising configuring the switching arrangement into:
- the third mode which is a series termination mode, in which the internal energy source is in series between the first line of the two-line power input and a second line of the second, two-line, output; or
- a fourth mode, which is a parallel feeding mode, in which the internal energy source is in parallel with the two-line power input and the first line of the two-line power input is not connected to the first line of the second, two-line, output.

14. The method as claimed in claim 12, further comprising controlling a supply of power to the corresponding one of the set of appliances from the two-line power input or from the internal energy source, and controlling charging of the internal energy source.

* * * * *